W. COSTELLO, Jr.
CAKE COATING MACHINE.
APPLICATION FILED FEB. 10, 1916.

1,257,677.

Patented Feb. 26, 1918.
3 SHEETS—SHEET 1.

Inventor
William Costello, Jr.
by his Attorneys
Howson & Howson

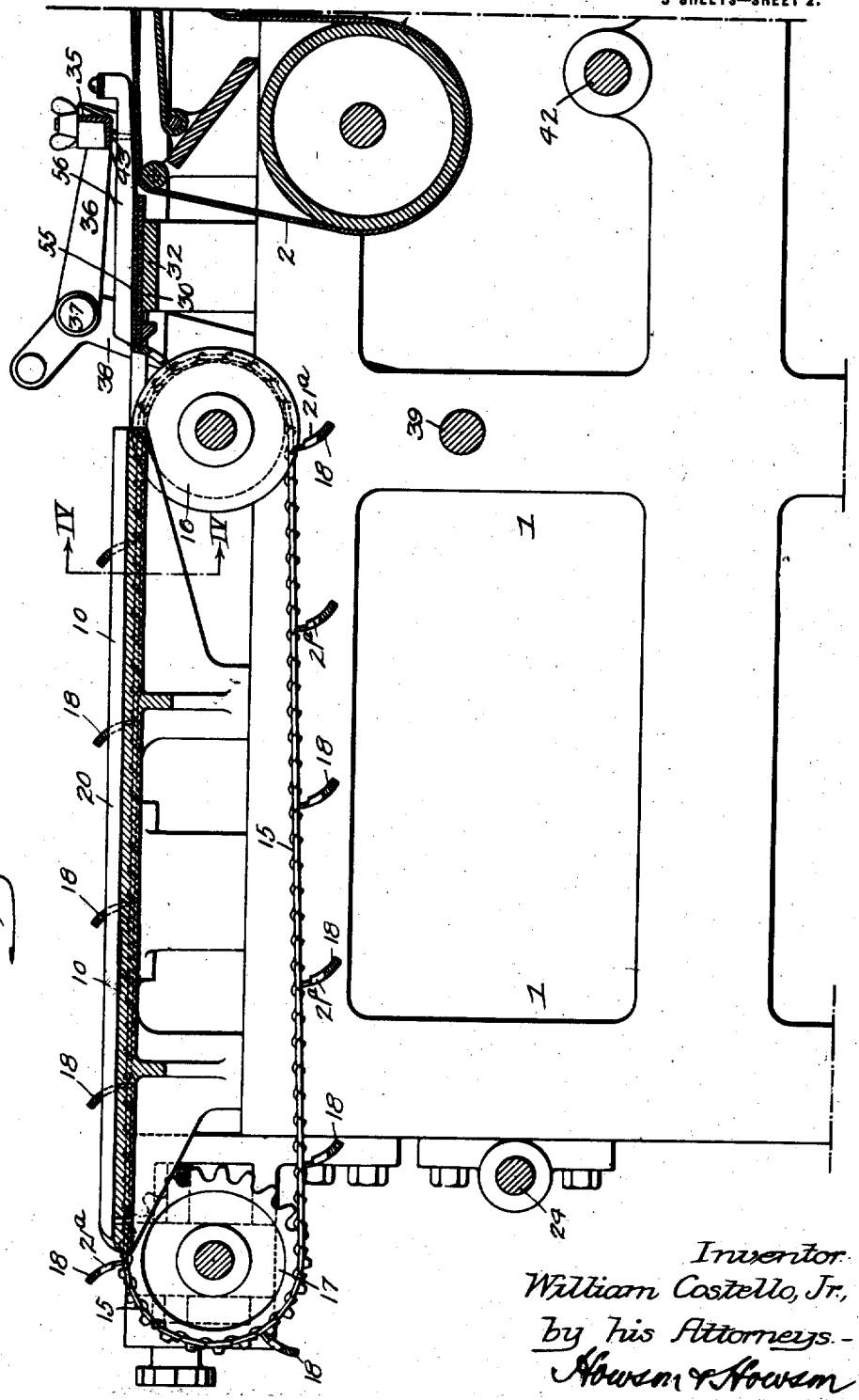

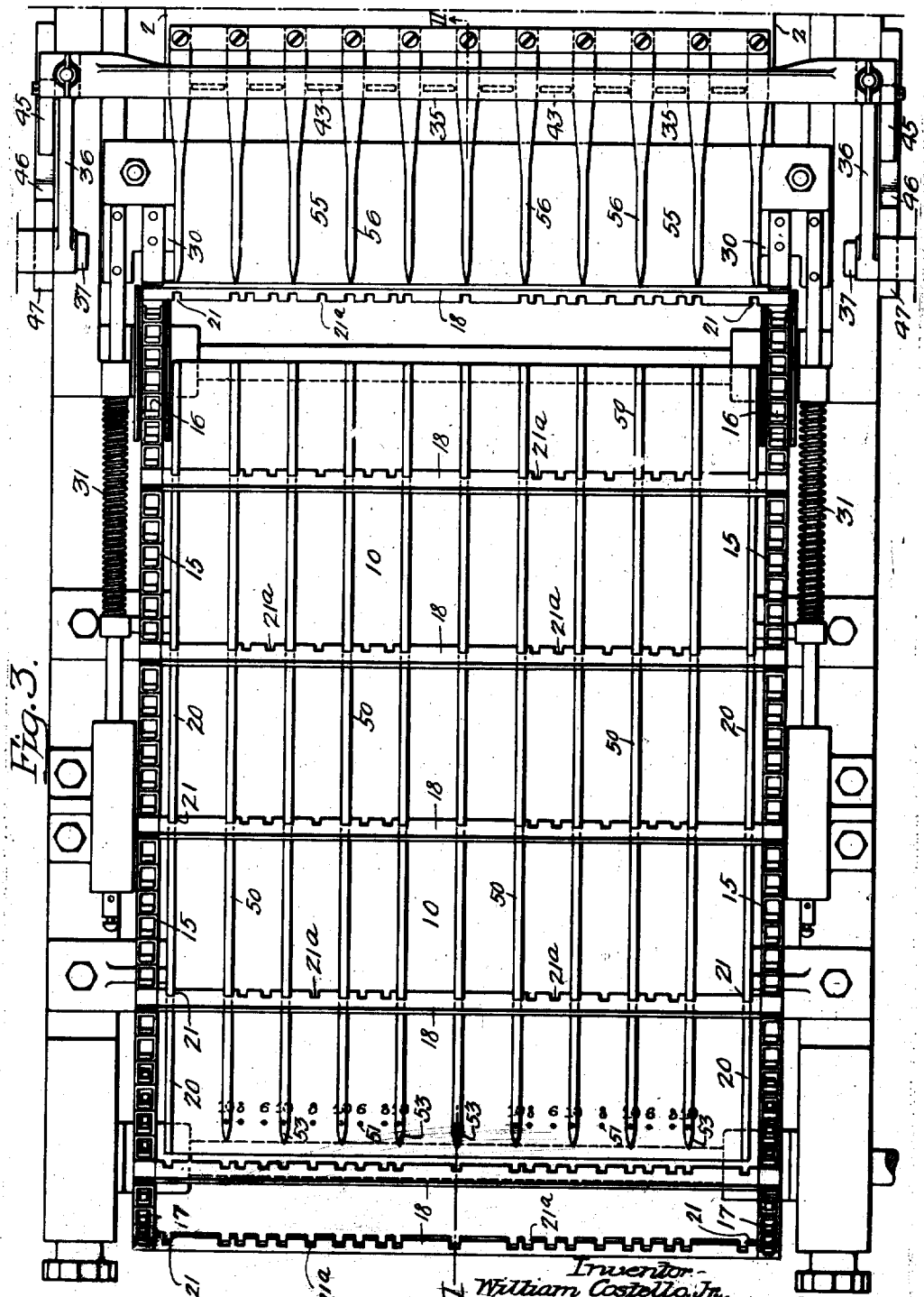

UNITED STATES PATENT OFFICE.

WILLIAM COSTELLO, JR., OF PHILADELPHIA, PENNSYLVANIA.

CAKE-COATING MACHINE.

1,257,677.   Specification of Letters Patent.   Patented Feb. 26, 1918.

Application filed February 10, 1916. Serial No. 77,507.

*To all whom it may concern:*

Be it known that I, WILLIAM COSTELLO, Jr., a citizen of the United States, residing in Philadelphia, Pennsylvania, have invented certain Improvements in Cake-Coating Machines, of which the following is a specification.

My invention relates to machines for applying coating material such as jelly, icing, marshmallow and the like to previously baked cakes, crackers, &c., and the object of my present invention is to provide means for automatically feeding or bringing such cakes, crackers and the like into definite relation with respect to the nozzles of depositing mechanism so that material discharged from a suitable hopper through such nozzles may be properly distributed or disposed upon the cakes, crackers or the like in registry beneath said nozzles.

My invention comprises adjustable cake guiding means whereby ways or passages differing in width for cakes of different width may be provided, together with means for moving the cakes along such ways, in combination with a movable platform or bridge disposed between the feed table and the endless cake carrying belt onto which the cakes are moved, with driving means overlying the said movable platform so that the cakes delivered onto the same will be maintained in the same position and alinement that they occupied when on the table.

My invention has been applied to a cake coating machine of usual type in which a carrying belt for the cakes, crackers, &c., is raised at timed intervals so as to bring the spaced rows of cakes carried thereby into coöperative relation with the depositing nozzles, and the feeding means in their broadest aspect are disclosed in the patent of P. D. Harton, 1,036,108.

These and other features of my invention are more fully described hereinafter, reference being had to the accompanying drawings, in which:

Fig. 2, is an enlarged sectional view on the line II—II, Fig. 3;

Fig. 3, is a plan view, and

Figure 4:
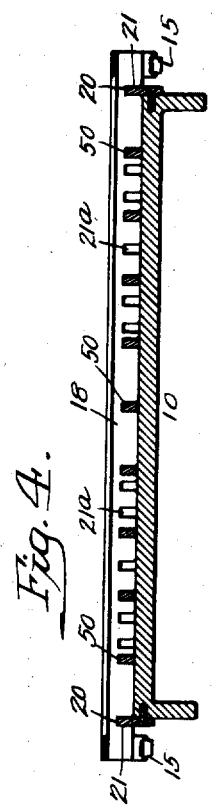
Fig. 4, is a sectional view on the line IV—IV, Fig. 2.
Figure 1:
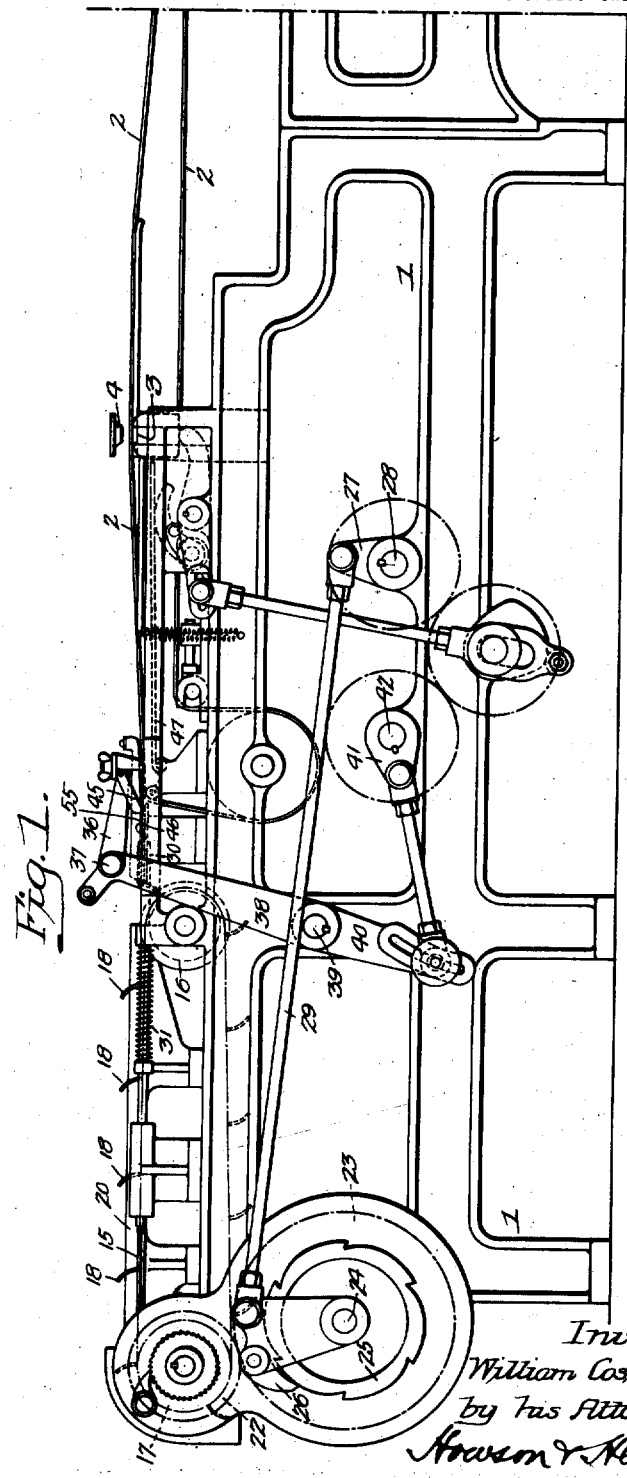
Figure 1, is a view in elevation of sufficient of a cake coating machine to illustrate the improvements forming the subject of my invention.

In the machine of the patent referred to, the cakes were arranged to be fed from a suitable table and alined over a suction device which holds them in coating position, and from the suction device they were pushed onto an endless belt which carried the cakes forward and discharged them onto suitable boards traversed by a conveyer beneath the endless belt and upon which they remained until dry.

The machine to which my present improvements are applied is substantially like that before referred to, having a frame 1, with rollers suitably journaled over which an endless cake-carrying belt 2 passes. This belt passes over a bed plate or table 3 which is raised at regular intervals so as to bring the spaced rows of cakes carried thereby into coöperative relation with discharge nozzles of a depositing device (not shown); one of such nozzles being shown at 4.

The belt is moved forward by suitable means, step-by-step, and during the periods of non-forward movement it is raised to bring the cakes into position to receive the coating material discharged from the nozzles of the depositing device. The mechanism for accomplishing these operations of the machine is well known and common to machines of the type.

In the present invention the cakes are delivered in proper alinement to the endless carrying belt 2, and are carried by said belt into proper position or registry beneath the discharge nozzles 4 of the depositing device (not shown). The cakes are first fed or placed upon a table 10 which is in the form of a flat bed, disposed in advance of the depositing device.

The means for feeding the cakes across this table or bed comprise chains or link belts 15 passing over and driven by suitable chain wheels 16 and 17; the chain wheels 17 being actuated at intervals by suitable means to traverse the cakes step-by-step, and said chains carry blades 18 adapted to move the cakes across the table. The table has raised sides 20, and the blades 18 are notched at 21 so as to accommodate said raised sides. The step-by-step movement may be imparted to the chain driving wheels 17 by gear wheels 22 and 23, respectively; the latter carried by a shaft 24, and being coupled to a ratchet wheel 25 actuated by a pawl 26 which receives its movement from a crank 27 mounted on a shaft 28, through the medium of a connecting rod 29.

As the cakes are moved forward by the blades 18 of the chains 15, they are finally brought to a point where they must leave the feed table 10, and from this they pass onto a movable platform or bridging member 30, disposed between the end of said table 10 and the endless conveyer belt 2. This platform is held in the retracted position adjacent the edge of said table 10 by means of springs 31, and is moved forward by engagement of the blades 18 therewith against the tension of these springs. The frame of the machine carries a fixed shelf or bridging support 32 upon which the movable platform 30 slides. By having a movable platform or bridging member 30 onto which the cakes may be moved by the blades 18, provision is made for closing the gap between the feed table 10 and the shelf 32, and at the same time the cakes may be advanced onto said shelf and said blades may pass around the chain wheels. The blades push the moving platform or bridging member out of the way and cause it to carry the cakes toward the belt 2 where such platform is held temporarily with the cakes in position to be engaged by a pusher member whereby they may be carried from said platform and placed in proper position on said conveyer belt 2. The platform 30 is retracted by the springs 31 immediately after it is released by the successive blades 18 passing under the same.

The pusher member for moving the cakes from the platform 30 onto the endless conveyer belt 2 is preferably of the character illustrated in Patents Nos. 939,836 and 1,036,108, and it may consist of or comprise a cross-bar 35 connected at its ends to arms 36, which may be pivotally connected at 37, to arms 38, secured to a rock shaft 39 journaled in the frame of the machine. Motion may be imparted to the arms 38 by a link 40 driven by a crank 41 on a shaft 42. The cross-bar 35 may have a series of depending projections 43 to engage a row of cakes, or a blade (not shown) may depend from the same, and this blade may be plain, or recessed in the manner illustrated in the Harton Patent, No. 1,036,108, before referred to. During the forward movement of the cross-bar its depending portion, whether in the form of the projections 43 or in the form of a blade, may just clear the surface of the platform, or it may rest upon the same; in either instance properly engaging the cakes so as to push them from the platform onto the endless conveyer belt 2. And in most instances, the plane of the movable platform 30 will be above the plane of the belt at the point where the cakes are pushed onto the latter. On the return movement of the pusher member, however, it is necessary to lift the same so as to clear the next row of cakes to be pushed onto the belt 2 from the platform 30. For this purpose I provide the cross-bar 35, or the arms 36, with latches 45, which trail with said pusher member on the forward movement. On the retraction of the pusher member, however, these latches drop into recesses 46 in side rails 47 which momentarily halts their lower ends so that upon continued rearward movement of the pusher member the ends of the latches will stop in the recesses 46 and fulcrum there so as to cause said latches to lift the cross-bar 35 clear of the row of cakes. On the forward movement of the cross-bar, the latches will drop down and trail on the rails 47 or the frame of the machine, and the cross-bar will lower into position behind the next row of cakes to be moved from the platform onto the belt 2.

In order that the cakes may be positively guided while being moved forward by the flights or blades 18 of the conveyer chains, I provide the table 10 with a plurality of guide bars or rails 50, and the flights or blades 18 of the chain are notched at 21ª so as to readily pass over the same. By this means the table may be arranged to accommodate four, six, eight or ten cakes in width; the number depending upon the dimensions of the same. In the present arrangement, the table 10 is shown as provided with the greatest number of rails it will accommodate for the smallest cakes to be coated; the same providing guideways for ten cakes, which are moved along by the flights or blades of the chain onto the movable platform 30, which in turn is shifted by said flights so as to bring the same into relatively close proximity with the belt 2 and onto which said cakes are moved by the pusher member in the manner described. To maintain the rails 50 in position, the table 10 is provided with apertures or recesses 51 adapted to receive pins 52 carried by the rear ends of said rails, and to facilitate engagement of the notched portions of the flights or blades 18 with the same, said ends of the rails are beveled as indicated at 53. The front ends of the rails are preferably free since they will be maintained in the proper position, laterally and vertically by the blades 18, passing over the same.

When relatively narrow cakes are being fed to the endless belt 2, I preferably mount upon the slidable platform 30, a second plate 55, having a plurality of guide rails or partitions 56 in line with the rails 50 of the table 10, and between which the cakes are moved; being delivered to the spaces on the plate 55 between the partitions 56 by the flights of the chain and moved from the same by the depending projections 43 of the pusher member. The partitions forming these spaces are relatively wedge-shaped, as clearly illustrated in the plan view, so as to insure proper alinement of narrow cakes and, as will be noted in Fig. 2, these partition elements are moved forward and overlie the belt 2; the platform being held by a conveyer flight, before the cakes are freed from the same. By this means definite and exact alinement of the cakes is insured. When feeding round cakes, the plate 55 with the partitions 56 will be removed, and the cross-bar 35 will be provided with a depending portion with rounded recesses to fit the cakes, as illustrated in the Harton Patent No. 1,036,108.

After the cakes have been passed onto the belt, their movement to the icing point or point where coating material is deposited from the nozzles 4 is wholly under the control of the belt, and in the timing of the movements of the various parts of the mechanism, including the timing of the movements of the belt 2; the cakes are moved away from the platform, and particularly away from the partitions 56 of the plate 55, before said plate and the platform 30 are retracted. By this means the danger of displacement of the cakes by these guides is prevented.

While I have described means for moving regular numbers of cakes across the table 10 and means for moving them onto the belt 2, it will be understood that I may move any number of cakes within the scope or range of the machine, and that by properly arranging the guides, cakes of different sizes and shapes may be fed to the coating means at one operation; such coating means being modified accordingly.

The mechanism for timing the movements of the machine, including the feeding means, the pusher means, and the endless belt, are common to machines of this kind, and the usual means will be employed for effecting such movements in proper timed relation so that rows of cakes in regular order will be carried by the endless belt 2 and delivered by the latter to the drying boards.

I claim:

1. In a cake coating machine, a feed table, a plurality of rails adjustably mounted on said table and forming guide-ways between which cakes may be positioned, movable blades overlying said rails for engaging and moving the cakes; each of said blades being provided with a plurality of notches so as to accommodate the rails when the latter are disposed in any of their various positions, in combination with a movable platform receiving the cakes delivered by said blades from the guide-ways between the rails; said platform being pushed out of the way at intervals by the moving blades, and an endless carrying belt receiving the spaced cakes from said movable platform.

2. In a cake coating machine, a feed table, a plurality of rails adjustably mounted on said table and forming guide-ways between which cakes are positioned, movable blades overlying said rails for engaging and moving the cakes; each of said blades being provided with a plurality of notches so as to accommodate the rails when the latter are disposed in any of their various positions, a movable platform receiving the cakes delivered by said blades, said platform being pushed out of the way at intervals by the moving blades, and guiding means carried by said platform in alinement with the guide rails of the feed table, in combination with a belt receiving the cakes from the movable platform.

3. In a cake coating machine, the combination of a feed table, a plurality of endless conveyer chains, pusher or conveyer flights carried by said chains, guide rails on the table, said flights being slotted for passage over the rails, an endless conveyer belt, a shiftable bridge between the feed table and the conveyer belt, and guiding means carried by said bridge in line with the guide rails of the feed table and overlying said conveyer belt.

4. In a cake coating machine, the combination of a feed table, a plurality of endless conveyer chains for moving cakes across the same, an endless conveyer belt, a shiftable bridge between the feed table and the conveyer belt, guiding means carried by said bridge and overlying said conveyer belt, and means for moving the cakes from said bridge through its guiding means onto the endless conveyer belt.

5. In a cake coating machine, a feed table, a plurality of adjustably mounted rails forming guide-ways between which cakes are positioned carried by said feed table; each of said rails having positioning pins and the table having a plurality of recesses to receive said pins whereby a plurality of guide-ways of various widths may be provided on said table, endless chains mounted at the sides of the table, and movable blades carried by said chains for engaging and moving the cakes on said table; said blades being provided with a plurality of notches to overlie the rails in any of the various positions of the same, in combination with an endless conveyer belt disposed beyond the feed table, a movable platform receiving the cakes delivered by said blades from the spaces between the rails of the feed table, said platform being pushed forward out of the way by the blades, and means for moving the cakes from said movable platform onto the endless conveyer belt.

WILLIAM COSTELLO, Jr.